United States Patent
Durham et al.

(10) Patent No.: US 7,731,780 B1
(45) Date of Patent: *Jun. 8, 2010

(54) APPARATUS AND PROCESS FOR PREPARING SORBENTS FOR MERCURY CONTROL AT THE POINT OF USE

(75) Inventors: Michael D. Durham, Castle Rock, CO (US); Cameron E. Martin, Denver, CO (US)

(73) Assignee: ADA Environmental Solutions, LLC, Littleton, CO (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/835,890

(22) Filed: Aug. 8, 2007

Related U.S. Application Data

(63) Continuation of application No. 10/817,616, filed on Apr. 2, 2004, now Pat. No. 7,361,209.

(60) Provisional application No. 60/460,478, filed on Apr. 3, 2003.

(51) Int. Cl.
*B01D 53/64* (2006.01)
*B01D 53/06* (2006.01)

(52) U.S. Cl. ............... 95/107; 95/131; 95/134; 110/345

(58) Field of Classification Search ............ 95/90, 95/107, 108, 131–134, 142, 901; 96/108, 96/150; 110/203, 345; 423/210
See application file for complete search history.

(56) References Cited

U.S. PATENT DOCUMENTS

| | | |
|---|---|---|
| 3,194,629 A | 7/1965 | Dreibelbis et al. |
| 3,677,696 A | 7/1972 | Bryk et al. |
| 3,755,161 A | 8/1973 | Yokota et al. |
| 3,873,581 A | 3/1975 | Fitzpatrick et al. |
| 3,961,031 A | 6/1976 | Yasui et al. |
| 4,069,140 A | 1/1978 | Wunderlich |
| 4,094,777 A | 6/1978 | Sugier et al. |
| 4,101,631 A | 7/1978 | Ambrosini et al. |
| 4,102,982 A | 7/1978 | Weir, Jr. |
| 4,196,173 A | 4/1980 | deJong et al. |
| 4,233,274 A | 11/1980 | Allgulin |

(Continued)

FOREIGN PATENT DOCUMENTS

DE 4317756 1/1995

(Continued)

OTHER PUBLICATIONS

U.S. Appl. No. 10/804,654, filed Mar. 19, 2004, to Durham.*

(Continued)

*Primary Examiner*—Frank M Lawrence
(74) *Attorney, Agent, or Firm*—Sheridan Ross P.C.

(57) ABSTRACT

A system for treating a contaminated gas stream is provided that includes a comminution device 204 operable to effect size reduction of a plurality of sorbent particles and form a plurality of comminuted particles, a plurality of nozzles 224 distributed through the gas stream and operable to introduce the plurality of comminuted particles into the gas stream, and a particle removal device 104 operable to remove at least most of the introduced comminuted particles and form a treated gas stream. The comminution device is in direct fluid communication with the nozzles.

28 Claims, 4 Drawing Sheets

U.S. PATENT DOCUMENTS

| | | | |
|---|---|---|---|
| 4,273,747 A | 6/1981 | Rasmussen | |
| 4,274,842 A | 6/1981 | Lindau | |
| 4,369,167 A | 1/1983 | Weir, Jr. | |
| 4,443,417 A | 4/1984 | Wiklund | |
| 4,459,370 A | 7/1984 | van der Wal et al. | |
| 4,474,896 A | 10/1984 | Chao | |
| 4,500,327 A | 2/1985 | Nishino et al. | |
| 4,530,291 A | 7/1985 | Wysk | |
| 4,583,999 A | 4/1986 | Lindahl et al. | |
| 4,693,731 A | 9/1987 | Tarakad et al. | |
| 4,709,118 A | 11/1987 | Yan | |
| 4,721,582 A | 1/1988 | Nelson | |
| 4,764,219 A | 8/1988 | Yan | |
| 4,764,355 A | 8/1988 | Romey et al. | |
| 4,771,030 A | 9/1988 | Audeh | |
| 4,786,483 A | 11/1988 | Audeh | |
| 4,786,484 A | 11/1988 | Nelson | |
| 4,814,152 A | 3/1989 | Yan | |
| 4,834,953 A | 5/1989 | Audeh | |
| 4,843,102 A | 6/1989 | Horton | |
| 4,844,815 A | 7/1989 | Ader et al. | |
| 4,863,489 A | 9/1989 | Suggitt | |
| 4,877,515 A | 10/1989 | Audeh | |
| 4,889,698 A | 12/1989 | Moller et al. | |
| 4,892,567 A | 1/1990 | Yan | |
| 4,902,662 A | 2/1990 | Toulhoat et al. | |
| 4,911,825 A | 3/1990 | Roussel et al. | |
| 4,913,068 A | 4/1990 | Brannstrom | |
| 4,917,862 A | 4/1990 | Kraw et al. | |
| 4,933,158 A | 6/1990 | Aritsuka et al. | |
| 4,962,276 A | 10/1990 | Yan | |
| 4,985,389 A | 1/1991 | Audeh | |
| 5,024,169 A | 6/1991 | Borowy | |
| 5,064,626 A | 11/1991 | Johnson et al. | |
| 5,080,799 A | 1/1992 | Yan | |
| 5,085,844 A | 2/1992 | Nowack et al. | |
| 5,120,515 A | 6/1992 | Audeh et al. | |
| 5,141,724 A | 8/1992 | Audeh et al. | |
| 5,173,286 A | 12/1992 | Audhe et al. | |
| 5,209,773 A | 5/1993 | Audhe et al. | |
| 5,216,966 A | 6/1993 | Martin | |
| 5,225,175 A | 7/1993 | Lyon | |
| 5,245,106 A | 9/1993 | Cameron et al. | |
| 5,248,488 A | 9/1993 | Yan | |
| 5,304,693 A | 4/1994 | Boitiaux et al. | |
| 5,322,128 A | 6/1994 | Bernhardt | |
| 5,322,628 A | 6/1994 | Yan | |
| 5,345,883 A | 9/1994 | Panos | |
| 5,409,522 A | 4/1995 | Durham et al. | |
| 5,435,980 A | 7/1995 | Felsvang et al. | |
| 5,460,643 A | 10/1995 | Hasenpusch et al. | |
| 5,505,766 A | 4/1996 | Chang | |
| 5,507,238 A | 4/1996 | Knowles | |
| 5,569,436 A | 10/1996 | Lerner | |
| 5,599,508 A | 2/1997 | Martinelli et al. | |
| 5,607,496 A | 3/1997 | Brooks | |
| 5,659,110 A | 8/1997 | Herden et al. | |
| 5,670,122 A | 9/1997 | Zamansky et al. | |
| 5,672,323 A | 9/1997 | Bhat et al. | |
| 5,695,726 A | 12/1997 | Lerner | |
| 5,811,066 A | 9/1998 | Winkler et al. | |
| 5,827,352 A | 10/1998 | Altman et al. | |
| 5,846,434 A | 12/1998 | Seaman et al. | |
| 5,854,173 A | 12/1998 | Chang et al. | |
| 5,900,042 A | 5/1999 | Mendelsohn et al. | |
| 5,965,095 A | 10/1999 | Owens et al. | |
| 6,090,355 A | 7/2000 | Winkler et al. | |
| 6,103,205 A | 8/2000 | Wojtowica et al. | |
| 6,136,281 A | 10/2000 | Meischen et al. | |
| 6,214,304 B1 | 4/2001 | Rosenthal et al. | |
| 6,270,679 B1 | 8/2001 | Kreisler | |
| 6,284,208 B1 | 9/2001 | Thomassen | |
| 6,294,139 B1 | 9/2001 | Vicard et al. | |
| 6,316,378 B1 | 11/2001 | Giebelhausen et al. | |
| 6,318,649 B1 | 11/2001 | Mazurkiewicz | |
| 6,322,613 B1 | 11/2001 | Wojtowicz et al. | |
| 6,342,129 B1 | 1/2002 | Vaughn et al. | |
| 6,350,520 B1 | 2/2002 | Nesbitt et al. | |
| 6,372,187 B1 | 4/2002 | Madden et al. | |
| 6,375,909 B1 | 4/2002 | Dangtran et al. | |
| 6,447,740 B1 | 9/2002 | Caldwell et al. | |
| 6,521,021 B1 | 2/2003 | Pennline et al. | |
| 6,524,371 B2 | 2/2003 | El-Shoubary et al. | |
| 6,528,030 B2 | 3/2003 | Madden et al. | |
| 6,533,842 B1 | 3/2003 | Maes et al. | |
| 6,534,024 B2 | 3/2003 | Honjo et al. | |
| 6,558,642 B2 | 5/2003 | El-Shoubary et al. | |
| 6,579,507 B2 | 6/2003 | Pahlman et al. | |
| 6,638,347 B2 | 10/2003 | El-Shoubary et al. | |
| 6,719,828 B1 | 4/2004 | Lovell et al. | |
| 6,808,692 B2 | 10/2004 | Oehr | |
| 6,818,043 B1 | 11/2004 | Chang et al. | |
| 6,848,374 B2 | 2/2005 | Srinivasachar et al. | |
| 6,881,243 B1 | 4/2005 | Khitrik et al. | |
| 6,953,494 B2 | 10/2005 | Nelson, Jr. | |
| 7,041,270 B2 | 5/2006 | Hammel et al. | |
| 2003/0099585 A1 | 5/2003 | Allgulin | |
| 2003/0161771 A1* | 8/2003 | Oehr | 423/210 |
| 2003/0206843 A1 | 11/2003 | Nelson, Jr. | |
| 2003/0219368 A1* | 11/2003 | Hammel et al. | 423/210 |
| 2004/0013589 A1 | 1/2004 | Vosteen et al. | |
| 2005/0039598 A1 | 2/2005 | Srinivasachar et al. | |

FOREIGN PATENT DOCUMENTS

| | | |
|---|---|---|
| EP | 1225967 | 7/2002 |
| JP | 10-216476 | 8/1998 |
| WO | WO 01/26784 | 4/2001 |
| WO | WO 03/093518 | 11/2003 |

OTHER PUBLICATIONS

U.S. Appl. No. 60/377,790, filed May 5, 2002.*
U.S. Appl. No. 10/817,616, filed Apr. 2, 2004, to Durham.*
"Control Technology; Full-Scale Testing of Mercury Control Via Sorbent Injection", available at www.netl.doe.gov/coal/EWR/mercury/control-tech/comp-design.html, Jul. 28, 2005, 2 pages.
Durham, Michael, "Full-Scale Evaluation of Mercury Control by Injecting Activated Carbon Upstream of ESPS", Sep. 2003, 15 pages.
Durham, Michael, "Tools for Planning and Implementing Mercury Control Technology", American Coal Council, 2003, 3 Pages.
U.S. Appl. No. 10/817,616, filed Apr. 2, 2004, Durham.
U.S. Appl. No. 10/804,654, filed Mar. 19, 2004, Durham.
Durham, Micheal, "Field Test Program to Develop Comprehensive Design, Operating and Cost Data for Mercury Control", DOE/NETL's Mercury Control Technology R&D Program Review, Aug. 12, 2003, 48 pages.
Fluid Energy Processing and Equipment Company Brochure entitled "Comprehensive Solution for Fine Powder Processing," dated 2003, 4 pages.
Michael D. Durham, "Field Test Program to Develop Comprehensive Design, Operating and Cost Data for Mercury Control," DOE/NETL's Mercury Control Technology, R&D Program Review, dated Aug. 12, 2003, 4 pages.
Netzsch Incorporated Brochure entitled "Netzsch-CONDUX® Fluidized Bed Jet Mill CGS," dated Sep. 2003, 2 pages.
R.K. Srivastava et al., "Flue Gas Desulfurization: The State of the Art," J. Air & Waste Manag. Assoc., vol. 51 (Dec. 2001), pp. 1676-1688.
Wylecial et al.; "The Activation of Sorbent in a Jet Mill in the Combusion-Gas Sulfur Removal Process"; Technical University of Czestochowa; (date unknown); pp. 1-6.

* cited by examiner

APPARATUS AND PROCESS FOR PREPARING SORBENTS FOR MERCURY CONTROL AT THE POINT OF USE

CROSS REFERENCE TO RELATED APPLICATIONS

The present application is a continuation of U.S. patent application Ser. No. 10/817,616, filed Apr. 2, 2004, (now U.S. Pat. No. 7,361,209), which claims the benefit of U.S. Provisional Patent Application No. 60/460,478, filed Apr. 3, 2003, the entire disclosures of which are hereby incorporated herein by reference.

FIELD OF THE INVENTION

The present invention is directed generally to treatment of gases to remove controlled materials and specifically to the treatment of flue gases to remove mercury and other contaminants.

BACKGROUND OF THE INVENTION

Each year, the emission of air toxics from combustion sources is being subjected to increasingly strict regulations. These regulations include not only existing regulations, such as the U.S. Clean Air Act as amended in 1970, 1977, and 1990, the National Energy Act, and the National Primary and Secondary Ambient Air Quality Standards, but also pending regulations that will require the removal of certain air toxics from utility plant flue gas. Title III of the Amendments governs air toxics. As used herein, an "air toxic" refers to the 189 chemicals listed in the Clean Air Act. Air toxics are present in the flue gas of combustion sources and appear both as particulate metals such as nickel, arsenic, and chromium in fly-ash particles and as vapor phase metals such as mercury, selenium, halogens, and halides and organic vapors. Vapor phase air toxics are commonly present in flue gas in trace concentrations of parts per million or less and therefore can be difficult to remove to comply with pertinent regulations.

Several systems have been developed to remove trace quantities of air toxics from flue gas. The systems have had varying degrees of success.

In one system, activated carbons and carbons treated chemically to produce sulfide or iodide compounds with mercury are injected into a gas stream ahead of a particulate collection device, such as a Fabric Filter (FF), ElectroStatic Precipitator (ESP), Spray Dry Absorber (SDA), and Flue Gas Desulfurization (FGD) device. The activated carbon is typically introduced into the gas stream by blowing the carbon, in a dry particulate form, into the gas stream. While in flight, the carbon reacts with the entrained air toxics and binds the air toxics to the surfaces of the carbon. The air toxic-containing carbon is then removed by the FF, ESP, SDA, and/or FGD.

The carbons used for the mercury removal process are generally of high surface area and ground by the manufacturer to a small particle size, typically in the range of 10 microns to 100 millimeters. Manufacturers make different grades of carbon depending on the specific properties desired for a particular application. Activated carbon is manufactured in a finished form at centralized manufacturing locations. The material is then shipped in bulk form over long distances to end user locations using various means, such as supersacks, rail car and truck.

SUMMARY OF THE INVENTION

These and other needs are addressed by the various embodiments and configurations of the present invention. The present invention is directed to the comminution of a sorbent before introduction into a contaminated gas stream. As used herein, a "sorbent" refers to a substance having a capacity to adsorb, absorb, and/or otherwise entrap a desired material, such as an air toxic.

In one embodiment, the present invention is directed to a method for treating a contaminated gas stream comprising one or more contaminants that includes the steps of:

(a) combusting a feed material, to produce a contaminated gas stream;

(b) comminuting a plurality of sorbent particles having a first size distribution to form comminuted sorbent particles having a second size distribution, the second size distribution being smaller than the first size distribution; and (c) thereafter introducing the comminuted sorbent particles into the gas stream to remove the one or more contaminants.

The comminution of the sorbent particles is typically performed on site and without intermediate storage. As used herein, "on-site" refers to the general area of the combustion chamber, utility or other type of plant and can include transporting continuously the sorbent particles from a location near the chamber, utility or plant by means of a conveyor, slurry line, or pneumatic line, even though the location is not on the physical site of the chamber, utility or plant. The time between the completion of the comminuting and introducing steps is preferably no more than about 1 hour, no more than about 30 minutes, no more than about 10 minutes, no more than about 1 minute, preferably no more than about 30 seconds, and most preferably no more than about 1 to 10 seconds. Normally, the comminution device is at least substantially co-located with the nozzles and remainder of the sorbent injection system.

While not wishing to be bound by any theory, it is believed that the sometimes low contaminant removal rates of sorbents in commercial applications are due in large part to the agglomeration of particles during transportation from the manufacturer to the end user and during on-site storage before use. Agglomeration can dramatically change the effective particle size distribution. In other words, agglomeration can cause a larger mean and median sorbent particle size. When the sorbent is introduced into the gas stream, the larger particle size distribution provides, per unit of sorbent, fewer particles in the gas stream for contaminant sorbtion and removal. This can cause a substantially reduced sorbent removal efficiency. To attempt to overcome this problem, end users can introduce more sorbent per unit volume of gas stream, thereby resulting in much higher operating costs.

The method can have a number of benefits compared to existing processes. First, on-site milling can provide a sorbent particle size distribution that is relatively small and highly effective in removing contaminants. As will be appreciated, a finer particle size provides a greater number of particles in the gas stream for a given amount of sorbent, a high mass transfer rate to the gas stream, and a smaller interparticle distance in the gas stream. These factors can provide a higher rate of contaminant removal. On-site milling can also expose fresh, unreacted (more active) surfaces for contaminant capture. As will be appreciated, certain sorbents can react with the surrounding atmosphere when exposed to the atmosphere for prolonged periods, such as during shipping, thereby reducing the air toxic capacity of the sorbent. Second, the use of on-site milling permits the sorbent to be shipped as larger particles, thereby providing higher packing densities during shipment, greater ease of material handling, less product loss during transportation and handling, and lower transportation and operating costs. For example, raw (unmilled) activated carbon can be produced at centralized facilities, shipped to the end user site, and there processed (milled) to produce a desired particle size. As will be appreciated, the bulk density of the finished (milled) activated product is much less than the bulk density of raw activated carbon. Third, the sorbent processed on site can meet tighter specifications, particularly size distribution specifications. The on-site processed sorbent particles can, for example, have a narrower and smaller size distribution than milled sorbent particles shipped long distances. Fourth, on-site processing permits additional ingredients (such as other sorbents) to be introduced into the mill along with the sorbent to produce an enhanced sorbent material. The sorbent material, for instance, can be a customized blend having desired properties that is uniquely suited for the specific application.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
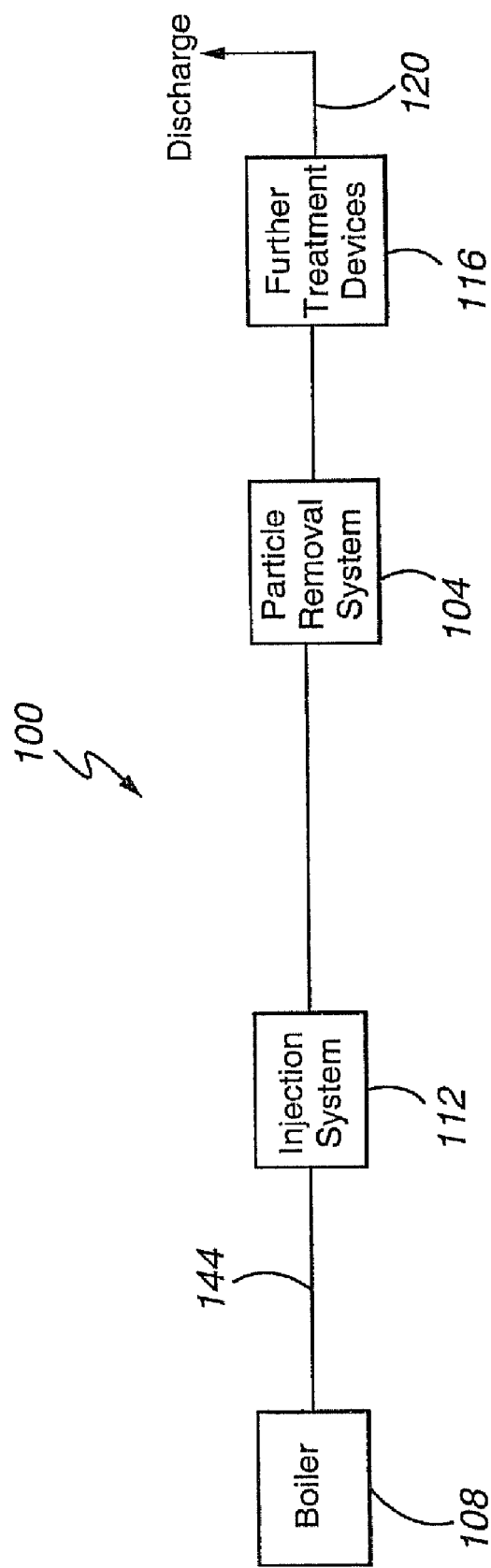
FIG. 1 is a block diagram of a flue gas processing system according to an embodiment of the present invention.
Figure 2:
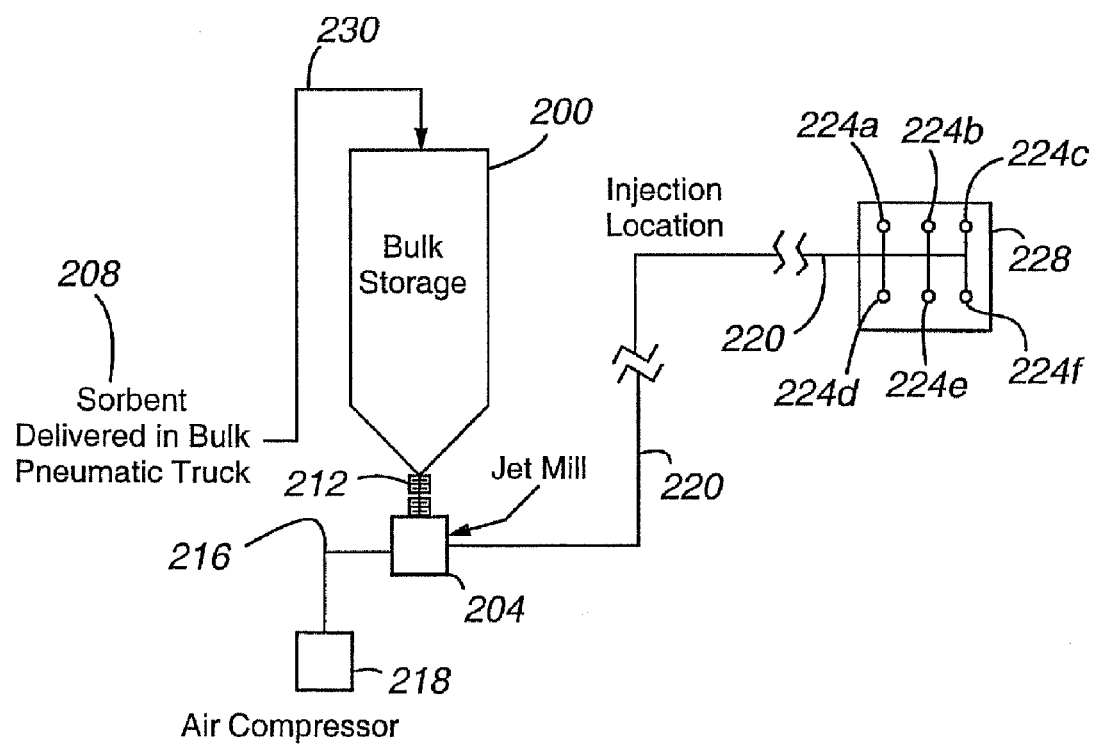
FIG. 2 is a diagram depicting a portion of the sorbent injection system according to an embodiment of the present invention.

A first embodiment of the flue gas processing system of the present invention is shown in FIG. 1. The system 100 includes a sorbent injection system 112, particle removal device 104, and further treatment device(s) 116, all positioned downstream of boiler 108. The treated gas 120 is discharged through a stack into the exterior environment. As will be appreciated, the boiler 108 combusts a suitable fuel, typically coal. The temperature of the flue gas 144 outputted from the boiler 108 typically at least about 1,000 degrees F. When a heat exchanger (not positioned) is positioned downstream of the boiler 108 and upstream of the injection system 112, the temperature of the flue gas 144 outputted by the heat exchanger is in the range of about 250 to about 650 degrees F. (which is above the acid dew point).

The flue gas 144 includes a number of controlled contaminants. For example, a typical flue gas 144 includes from about 100-4,000 ppm sulfur oxides, from about 50-2,000 ppm nitrous oxides, and from about 1-200 ppm hydrogen chloride; from about 1-20 grains per actual cubic feet of particulates (at least most of which are flyash); and from about 0.1 ppb to about 10 ppm vapor phase air toxics. These amounts of these contaminants must be reduced to acceptable levels before emission of the flue gas into the environment.

The particulate removal device 104 is any suitable device for effecting removal of at least most of the rejected sorbent particles. Typically, the device is a fabric filtration device such as a baghouse, a (wet or dry) electrostatic precipitator, a scrubber, a flue gas desulfurizer, and/or a combination thereof. The device 104 typically removes at least about 95% and more typically at least about 99% of the entrained particles from the flue gas 144.

The further treatment device(s) 116 can remove contaminants not removed sufficiently by the sorbent. Typically, the device(s) include a flue gas desulfurizer and is preferably a wet flue gas desulfurizer. The flue gas desulfurizer 116 typically removes at least most of the acid gases (e.g., sulfur dioxide and hydrogen chloride) and some of the air toxics. Examples of desulfurizers include spray towers, limestone, magnesium limestone, ammonia, forced oxidation, bubbling bed reactors, wet scrubbers, semi-wet scrubbers, dry scrubbers, and combinations thereof. The preferred desulfurizer is a wet scrubber having a vertical tower construction. The specific scrubbing agent(s) in the absorption zone depend on the contaminants being removed. Examples of scrubbing agents include an alkaline solution, such as a calcium-based slurry (such as a solution containing lime) and a sodium-based solution, for removing sulfur oxides (i.e., $SO_x$, where x is 2, 3, or 4) and an ammonia-based solution, metals such as iodine dissolved in an organic solvent, organic solvents such as methanol, and a solution of Fe(II) ions and thiosulfate in a miscible mixture of water and alcohol or a non-aqueous solvent, an emulsion of water-in-organic sulfoxides for removing both sulfur oxides and/or nitrous oxides (i.e., $NO_x$, where x is 1, 2, or 3). Typically, the flue gas desulfurizer 116 removes at least about 90% and more typically at least about 98% of the $SO_2$; and at least about 80% and more typically at least about 90% of the HCl present in the flue gas. The desulfurizer 116 typically reduces the temperature of the flue gas to the bulk water dew point, which is commonly about 52.5° C.

As will be appreciated, a flyash particle removal system and flue gas desulfurizer can be positioned upstream of the sorbent injection system 112 as described in copending U.S. patent application Ser. No. 10/804,654, filed Mar. 19, 2004, entitled "METHOD FOR REMOVING AIRBORNE TOXIC MATERIALS FROM FLUE GAS" to Durham, et al., which is incorporated herein by this reference. The flyash particles may be removed before injection of the sorbent particles by the sorbent injection system 112 or simultaneously with the removal of the sorbent particles by the particle removal system 104.

When the FGD device precedes or is upstream of the injection system 112, the sorbent may be selected to remove contaminants in addition to air toxics. The desulfurized flue gas output by the FGD commonly includes from about 5 to about 200 ppm sulfur oxides, and from about 0.2 to about 40 ppm hydrogen chloride. In the desulfurizer, it is common to have some acid gas, such as sulfur trioxide and sulfuric acid, form an acid mist that must be removed to produce a compliant waste gas. The acid mist forms when sulfur-containing gases are exposed in the desulfurizer with a scrubbing agent that is an alkaline medium to remove a majority of the sulfur species. A portion of the sulfur species forms the acid mist that is typically not captured by the desulfurizer.

The sorbent injection system 112 further treats the gas to produce a compliant waste gas. The sorbent injection system 112 can have a number of differing configurations depending on the sorbent employed. The sorbent may be configured to remove air toxics, sulfur oxides, nitrous oxides, hydrochloric acid vapor, hydrogen sulfide vapor, acid gas, hydrogen fluoride, and/or condensibles (which include organic compounds). The sorbent preferably is a free flowing particulate (carbon or non-carbon based) solid, such as activated carbon, molecular sieves, zeolites, chars, soots, aluminas, magnesium oxide, limestones, silicates such as the sorbents manufactured by Amended Silicates, LLC, mineral sorbents such as the sorbents manufactured by CDEM Holland B.Z., or another suitable sorbent material and/or carbon, molecular sieves, zeolites, and other impregnable substrates including on exposed surfaces various substances, such as metals, metal compounds, sulfur, sulfur compounds, and combinations and mixtures thereof.

Examples of suitable sorbents are discussed in U.S. Pat. Nos. 6,558,642; 6,533,842; 6,524,371; 6,375,909; 6,372,187; 6,322,613; 6,270,679; 6,136,281; 6,103,205; 5,900,042; 5,695,726; 5,670,122; 5,607,496; 5,569,436; 5,460,643; 5,409,522; 5,322,128; 5,248,488; 5,245,106; 5,225,175; 5,141,724; 5,120,515; 5,085,844; 5,064,626; 4,933,158; 4,902,662; 4,892,567; 4,877,515; 4,843,102; 4,834,953; 4,814,152; 4,786,484; 4,786,483; 4,771,030; 4,764,219; 4,721,582; 4,709,118; 4,500,327; 4,474,896; 4,459,370; 4,369,167; 4,196,173; 4,101,631; 4,094,777; and 3,755,161, each of which is incorporated herein by this reference.

A preferred air toxic absorbent is activated carbon. Activated carbon is a mature and widely used technique for removing air toxics, such as mercury, from gas streams. Activated carbon is finely divided which allows it to be introduced into a flowing gas stream and flow along with the gas stream. Activated carbon, when entrained in the gas stream, has been proven to collect air toxics through in-flight capture.

As shown in FIG. 2, the injection system 112 typically includes a hopper 200 in fluid communication with a comminution device 204 that comminutes the sorbent 208 to a desired size range. The bulk sorbent 208 is typically delivered by a supersack, pneumatic rail car or pneumatic truck. The comminuted sorbent 300 is conveyed pneumatically via an air eductor (not shown) powered by an air line 216 supplying air from the air source 218 (or air compressor). As air passes through the air line 216 and past the eductor, solid particles outputted by the comminution device 204 are aspirated and conveyed (by dilute phase techniques) via air line 220 directly to a plurality of injection nozzles 224*a-f* and distributed substantially uniformly throughout the duct 228 as a plurality of solid particles.

The injection nozzles 224 can be in any suitable configuration, such as in a horizontal and/or vertical arrangement. Each nozzle typically includes a pipe header of approximately 2 to 6 inches in diameter having a plurality of about ¼ to 1 inch nozzles for uniform particulate injection into the duct. The introduction rate of the sorbent is adjusted so that the gas downstream of the nozzles and upstream of the particle removal system 104 includes from about 0.5 to 20 pounds of sorbent per million actual cubic feet of gas. A preferred introduction rate is from about 3 to about 5 pounds of sorbent per million actual cubic feet of gas.

The size distribution of the comminuted sorbent 300 depends on the application. On the one hand, an extremely fine particle size distribution is desired to provide more particles for introduction into the gas stream, thereby providing a greater degree of contaminant removal for a given amount of sorbent. On the other hand, if the particle size distribution is too fine the sorbent particle collection efficiency of the particle removal system 104 will decrease, potentially causing an unsightly plume when the gas 120 is discharged from the stack. The comminuted sorbent particles preferably have a $P_{90}$ size ranging from about 0.5 to about 25 microns, more preferably from about 1 to about 10 microns, and even more preferably from about 0.2 to about 5 microns. Typically, no more than about 20% of the particles have a size greater than about 100 microns and even more typically a size greater than about 10 microns. Immediately before being inputted into the comminution device 204, the sorbent particles preferably have a $P_{90}$ size ranging from about 10 microns to about 1 millimeter and no more than about 20% of the particles have a size greater than about 2 millimeters. The pre-comminuted sorbent can be in pelletized, granular, or powdered form.

To realize these fine particle sizes, and not intending to be limited by the particular device, the preferred comminution devices are a jet mill or agitated media attrition mill. As will be appreciated, a jet mill uses a high pressure fluid stream, such as air, an inert gas such as hydrogen, or a liquid such as water, to effect particle comminution or size reduction. The high pressure fluid is supplied to a grinding chamber via nozzles. High velocity (e.g., sonic or supersonic velocity) fluid (liquid or gas) exiting the nozzles accelerates the particles introduced into the jet mill resulting in size reduction due to particle-to-particle collisions. The expanding fluid conveys the material to a particle size separator, such as a classifier, venturi, centrifuge, and the like, that rejects oversize material back to the grinding zone and allows a predetermined particle size to pass through. The particle size distribution can be adjusted by changing the setting(s) of the particle size separator, the air/liquid pressure, fluid flow, or nozzle size and configuration. The particles can be introduced into the jet mill by any suitable technique, such as in a fluidized bed and entrainment in the high pressure gas stream itself. Any type of jet mill may be employed such as the pancake jet mill, the loop jet mill, the opposing-nozzle jet mill, the Majac mill, the Gem-T mill, the flooded grinding chamber mill, and the aeroplex or fluidized bed jet mill. Examples of suitable jet mills include the JET-O-MIZER™, ROTO-SIZER™, and ROTO-JET™ by Fluid Energy Processing and Equipment Company, the NETZSCH—CONDUX™ jet mill by Netzsch, the Atritor DIRECT OPPOSED JET MILL™, the Kurimoto CROSS JET MILL™, ALPINE 50 AS™ and 100AFG™ spiral jet mill, QYF™ fluidized-bed pneumatic jet mill, QYN™ ultrasonic pneumatic jet mill, SINGLE TRACK™ jet mill, SK JET-O-MILL™ CO-JET™ system, and the A-O™ jet mill. Examples of the agitated media attrition mills include, for example, Eirich Machines MAXXMILL™, and the Union Process Inc. ATTRITOR™. As will be appreciated, sensors, such as temperature, pressure and/or sound sensors, may be located within the mill and at the discharge of the mill to measure different processing parameters to measure the size of the sorbent particles created. The information received from the sensors can be used to control the mill operation to produce the desired particle size. The use of such sensors is further discussed in U.S. Pat. No. 6,318,649, which is incorporated herein by this reference.

In the agitated media attrition mill configuration of U.S. Pat. No. 6,318,649 for example, the mill includes an input (not shown) for the sorbent particles and a number of chambers to reduce the sizes of the sorbent particles by interparticle collisions and produce milled sorbent particles having a finer or smaller size distribution compared to the inputted sorbent particles. Preferably, a product size of the milled sorbent particles is less than about 15 microns and even more preferably in the range of about 1-5 microns. The output of the mill is preferably in direct fluid communication with nozzles distributed through the gas stream to introduce the milled sorbent particles into the gas stream. In a first chamber of the mill, the sorbent particles are subjected to a high-pressure liquid jet to form a first collection of sorbent particles. The first collection of particles are transported to a downstream second chamber of the mill. In the second chamber, the first collection of sorbent particles are subjected to cavitation to form a second collection of sorbent particles. The second collection of sorbent particles are then transported to a downstream third chamber of the mill. The third chamber includes a collider. In the third chamber, the second collection of sorbent particles collide with the collider and form the milled sorbent particles.

For optimal results and to avoid reagglomeration, the comminuted sorbent particles are not commonly stored after comminution but introduced directly into the gas stream. Typically, the time interval between output from the comminution device to introduction into the gas stream is no more than about 1 hour, no more than about 30 minutes, no more than about 10 minutes, no more than about 1 minute, preferably no more than about 30 seconds, and most preferably no more than about 1 to 10 seconds.

Figure 3:
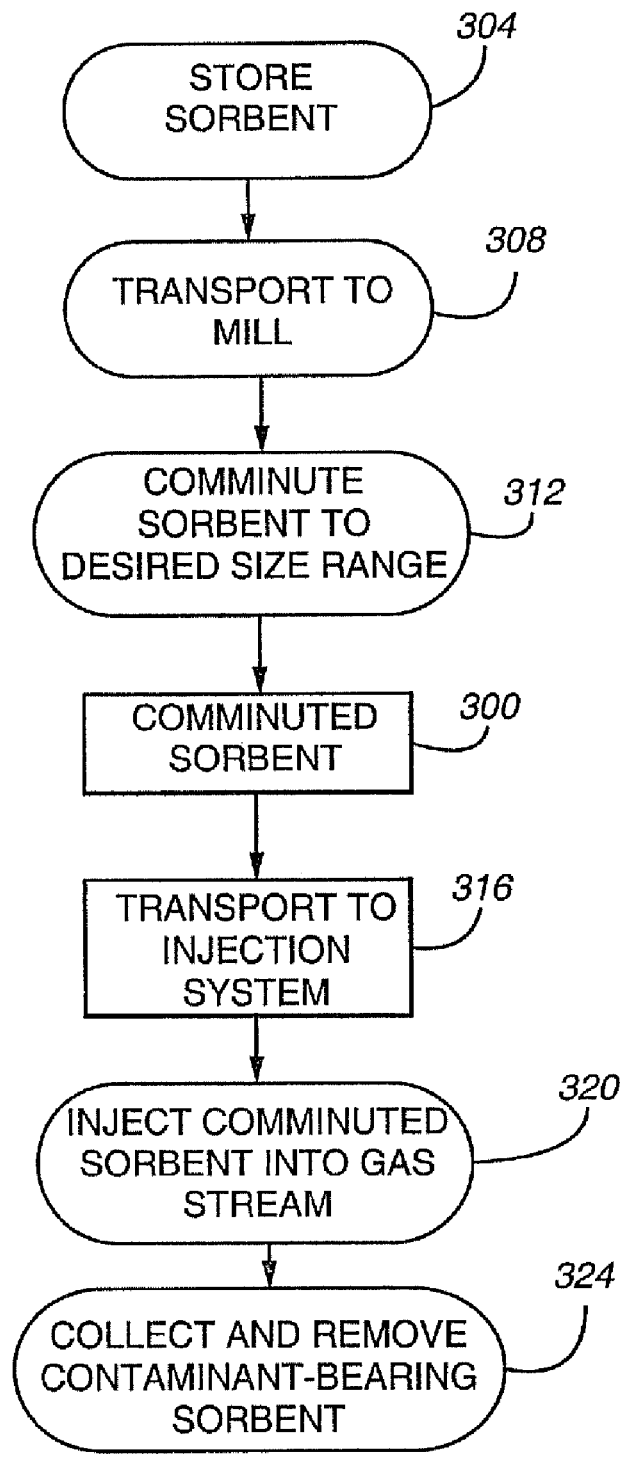
FIG. 3 is a flow chart of the operation of the gas processing system of FIG. 1.

The operation of the system 100 will now be discussed with reference to FIG. 3.

In step 304, the sorbent particles are shipped, such as by pneumatic railcar or truck, to the end user from the manufacturer and stored in the hopper 200 by means of air line 230.

In step 308, the stored sorbent particles are transported via a device 212 to the comminution device 204. The device 212 can be any suitable feeding device, such as a rotary screw-type feeder, a conduit using gravity to induce sorbent displacement, pneumatic feed line using pressurized air and an eductor, and the like.

In step 312, the comminution device 204 effects size reduction of the sorbent particles, such as by high velocity gas flow, to realize the desired size range. The size reduction is typically caused by high velocity particle-to-particle contact and/or particle-to-stationary surface contact. The typical size reduction factor of the sorbent particles in this step is at least about 5 and more typically ranges from about 10 to about 200.

In step 316, the comminuted sorbent 300 is aspirated continuously into a pressurized gas injection stream and transported by the air line 220 to the injection nozzles spaced at intervals throughout the cross section of the contaminated gas stream. As noted, it is preferred that the outputted comminuted sorbent 300 be fed continuously to the air line 220 without intermediate storage to avoid particle reagglomeration.

In step 320, the nozzles inject the comminuted sorbent particles 300 substantially uniformly throughout the gas stream. The contaminants are captured by the sorbent particles while the particles are in flight and by the sorbent particles that are captured in the particle removal device.

Entrained air toxics and other contaminants are captured effectively by the entrained sorbent particles. Typically, at least about 50%, and more typically at least about 75% of the desired contaminants, typically air toxics, are captured by the sorbent particles. As an example of collecting mercury (an air toxic), mercury in the gas 144 leaving the boiler 108 at a concentration of 1-20 $\mu g/m^3$ can be collected at an efficiency of from 10-99% depending on the amount and capacity of the sorbent being injected by the injection system 112. In this case the output waste gas 120 to the stack comprises no more than about 0.01-18 $\mu g/m^3$ of mercury and typically no more than about 0.05-10 $\mu g/m^3$ of mercury.

In step 324, the contaminant-laden particles are collected by the particle removal system 104 and removed from the gas stream. The collected sorbent particles are removed periodically or continuously from the collection surface of the particle removal system 104 by any suitable technique, such as liquid transfer, rapping, reverse airflow and the like.

EXPERIMENTAL

Example 1

The following Example describes improved mercury control in flue gas achieved with finely ground sorbent particles.

This Example was carried out on the flue gas from an operating coal-fired power plant. A number of carbon sorbents, including DARCO FGD manufactured by Norit Americas (Marshall, Tex.) with a mass mean particle diameter of approximately 18 micrometers, was compared to DARCO INSUL, also manufactured by Norit Americas, with a mass mean particle diameter of approximately 6 micrometers, was injected into the flue gas, downstream of (i.e., after) an electrostatic precipitator (ESP), and upstream of a baghouse (fabric filter.) Flue gas temperature was approximately 300 degrees F. Mercury concentration was measured by a Semi-Continuous Emissions Monitor (S-CEM), in the following locations: upstream of the ESP and downstream of both the sorbent injection site and the baghouse.

Figure 4:
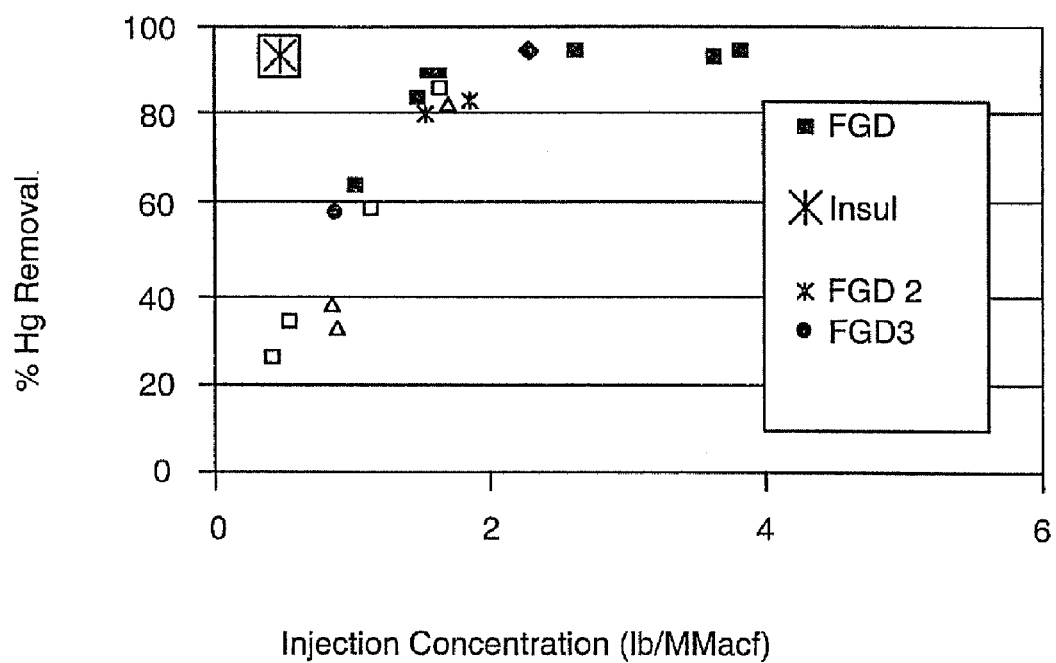
FIG. 4 is a graph showing mercury control using sorbents of 6 micrometers mass mean particle diameter compared to sorbents of 18 micrometers mass mean particle diameter.

FIG. 4 shows the results. The X-axis depicts the amount of carbon injected into the flue gas per unit volume of flue gas (lbs carbon per million actual cubic feet of flue gas treated, lbs/MMacf). The Y axis shows the measured mercury removal rate, measured as a percentage removed between the upstream sampling location and downstream sampling location. The percentage removal was measured for each type of sorbent. Mercury removal results were obtained for one injection concentration of DARCO INSUL only. The results are shown by the character referenced as "Insul" in the legend of FIG. 4. Mercury removal results were obtained for three injection concentrations of DARCO FGD. The results are shown by the characters referenced as "FGD, FGD2 and FGD3 in the legend of FIG. 4. The results indicated that DARCO INSUL, the 6 micrometer mass mean particle diameter sorbent, was more effective than the 18 micrometer mass mean particle diameter sorbent to remove mercury from flue gas streams.

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving, at a site of end use and from a manufacturer at a remote location, a free-flowing, particulate sorbent, the particulate sorbent particles having a first size distribution when received on site;
   (b) introducing the particulate sorbent into a chamber of an agitated media attrition mill, the agitated media attrition mill being located on site;
   (c) while in the chamber, reducing the sizes of the introduced particulate sorbent by inter-particle collisions to produce milled sorbent particles having a second size distribution, wherein the second size distribution is smaller than the first size distribution, and wherein a desired particle size of the milled sorbent particles is a size of less than about 15 microns; and
   (d) thereafter introducing, on site, the milled sorbent particles into a contaminated flue gas stream to remove one or more contaminants.

2. The method of claim 1, wherein step (c) is performed in a jet mill and wherein the contaminated flue gas stream is from the combustion of coal by a power plant, and wherein the power plant is located on site with the agitated media attrition mill.

3. The method of claim 2, wherein the reducing step (c) comprises:
   (C1) while in the chamber, subjecting the introduced particulate sorbent to a high-pressure liquid jet to form a first collection of sorbent particles;
   (C2) transferring the first collection of sorbent particles from the chamber to a first downstream chamber of the agitated media attrition mill; and
   (C3) while in the first downstream chamber, subjecting the first collection of sorbent particles to cavitation to form a second collection of sorbent particles.

4. The method of claim 3, further comprising:
   (C4) transferring the second collection of sorbent particles from the first downstream chamber to a second downstream chamber of the agitated media attrition mill;
   (C5) while in the second downstream chamber, colliding the second collection of sorbent particles with a collider to form milled sorbent particles.

5. The method of claim 1, wherein the one or more contaminants comprise an air toxic and wherein the time between the completion of the reducing step (c) to the introducing step (d) is no more than about 30 seconds.

6. The method of claim 3, wherein the particulate sorbent is activated carbon and further comprising:
   (C4) centrifugally separating the sorbent particles after step (C1) and before step (C2) to form the first collection of sorbent particles.

7. The method of claim 6, wherein the air toxic is at least one of nickel, arsenic, chromium, mercury, selenium, lead, a halogen, and a halide and wherein the first size distribution has a $P_{90}$ size ranging from about 10 microns to about 1 millimeter and the second size distribution has a $P_{90}$ size ranging from about 0.5 to about 25 microns.

8. The method of claim 1, wherein the agitated media attrition mill is autogenous and wherein, in the reducing step (c), the size reduction factor ranges from about 5 to about 200.

9. The method of claim 1, wherein the milled sorbent particles are free of intermediate storage after the reducing step (c) and before the introducing step (d).

10. The method of claim 1, wherein the reducing step (c) comprises:
    (C1) in the chamber, entraining the particulate sorbent in a high velocity fluid stream; and
    (C2) in the chamber, impacting the particulate sorbent at the velocity of the fluid stream against another particulate sorbent particle to effect size reduction.

11. The method of claim 1, wherein the milled sorbent particles are introduced directly into the gas stream after the reducing step (c).

12. The method of claim 1, wherein the particulate sorbent is transported from the remote site to the site by at least one of supersacks, truck, and rail and wherein a first bulk density of the particulate sorbent when received is greater than a second bulk density of the milled sorbent particles.

13. The method of claim 1, wherein step (c) comprises the substeps of:
    (C1) reducing the sizes of the particulate sorbent by inter-particle collisions to produce comminuted sorbent particles;
    (C2) rejecting oversized comminuted sorbent particles while passing comminuted sorbent particles having a predetermined particle size distribution;
    (C3) returning the rejected oversized sorbent particles to step (C1);
    (C4) outputting the passed sorbent particles as the milled sorbent particles.

14. The method of claim 1, wherein the attrition mill is a jet mill and wherein the contaminated flue gas stream is produced by a coal-fired power plant.

15. The method of claim 1, wherein, in the chamber, the particles of the particulate sorbent are subjected to a high-pressure liquid jet from a high-pressure liquid jet nozzle positioned in the chamber to form a first collection of sorbent particles, wherein a pressure of the liquid jet ranges from about 5,000 to about 100,000 psi, and wherein the agitated media attrition mill further includes:
    a first downstream chamber comprising a cavitation nozzle to discharge the first collection of sorbent particles and to subject the first collection of sorbent particles to cavitation to form a second collection of sorbent particles; and
    a second downstream chamber comprising a secondary slurry nozzle to create a second jet of slurry comprising the second collection of sorbent particles;
    a collider in the second downstream chamber to collide with the second collection of sorbent particles and form the milled sorbent particles; and
    an output for the milled sorbent particles.

16. The method of claim 1, wherein the agitated media attrition mill is in direct fluid communication with an injector in contact with the contaminated flue gas stream, the injector being operable to introduce the milled sorbent particles into the flue gas stream, wherein the one or more contaminants comprise an air toxic, and wherein the time between output of the milled sorbent particles from the agitated media attrition mill to passage of the milled sorbent particles through the injector is no more than about 30 seconds.

17. The method of claim 15, wherein the sorbent is activated carbon and
   wherein a centrifuge is positioned between the chamber and first downstream chamber to separate the particles of sorbent and form the first collection of sorbent particles.

18. The method of claim 16, wherein the air toxic is at least one of nickel, arsenic, chromium, mercury, selenium, lead, a halogen, and a halide, wherein the first size distribution has a $P_{90}$ size ranging from about 10 microns to about 1 millimeter and the second size distribution has a $P_{90}$ size ranging from about 0.5 to about 25 microns, and wherein the agitated media attrition mill has a size reduction factor ranging from about 5 to about 200.

19. The method of claim 16, wherein there is no intermediate storage between the output and the injector.

20. A method, comprising:
   receiving, at a site of end use of the sorbent and from a manufacturer at a remote location, a free-flowing, particulate sorbent, the particulate sorbent having a first size distribution when received on site;
   contacting the particulate sorbent with a pressurized fluid jet configured to effect comminution of the particulate sorbent to form a comminuted fluid stream;
   contacting, on site, the comminuted fluid stream with a collider positioned in a path of the comminuted fluid stream to further comminute the particulate sorbent;
   discharging, on site, comminuted particulate sorbent, wherein a second size distribution of the discharged, comminuted particulate sorbent is smaller than the first size distribution, and wherein the discharged, comminuted particulate sorbent has a size of less than about 15 microns; and
   thereafter introducing, on site, the discharged, comminuted particulate sorbent into a contaminated flue gas stream to remove one or more contaminants, the contaminated flue gas stream being from an industrial plant, wherein the industrial plant is located on site.

21. The method of claim 20, wherein the particulated sorbent is transported from the remote location to the end user site by at least one of supersacks, truck, and rail and wherein a first bulk density of the particulated sorbent when received is greater than a second bulk density of the milled sorbent particles.

22. The method of claim 20, wherein the one or more contaminants comprise an air toxic, wherein the sorbent is activated carbon, wherein the air toxic is at least one of nickel, arsenic, chromium, mercury, selenium, lead, a halogen, and a halide, wherein the particles of the particulate sorbent before comminution have a $P_{90}$ size ranging from about 10 microns to about 1 millimeter and, after comminution, a $P_{90}$ size ranging from about 0.5 to about 25 microns, and wherein, by the pressurized fluid jet, the size reduction factor ranges from about 5 to about 200.

23. The method of claim 20, wherein the particulate sorbent is contacted with a pressurized fluid jet having a pressure ranging from about 5,000 to about 100,000 psi and further comprising:
   passing the comminuted fluid stream through a cavitation nozzle to cavitate the comminuted particulate sorbent.

24. The method of claim 20, wherein a time period between discharging of the comminuted fluid stream and introduction of the discharged, comminuted particulate sorbent into the contaminated flue gas stream is no more than about one hour and wherein the fluid is water.

25. The method of claim 20, further comprising:
   centrifuging the discharged comminuted particulate sorbent after the discharging step and before the thereafter introducing step.

26. The method of claim 24, wherein the time period is no more than about 30 minutes.

27. The method of claim 20, wherein the one or more contaminants comprises one or more of air toxics, sulfur oxides, nitrous oxides, hydrochloric acid vapor, hydrogen sulfide vapor, acid gas, hydrogen fluoride, and condensibles, wherein the particulate sorbent is one or more of activated carbon, molecular sieves, zeolites, chars, soots, aluminas, magnesium oxide, limestones, and silicates, and wherein the second size distribution of the discharged, comminuted particulate sorbent is a $P_{90}$ size ranging from about 0.5 to about 25 microns.

28. The method of claim 20, further comprising:
   separating, by one or more of a classifier, venturi, and centrifuge, the discharged, comminuted particulate sorbent into coarse and fine fractions, wherein the coarse fraction is again contacted with the pressurized fluid jet and wherein the fine fraction is discharged as the comminuted particulate sorbent and wherein a size reduction factor of the particulate sorbent ranges from about 10 to about 200.

* * * * *